United States Patent [19]

Naimer et al.

[11] Patent Number: 5,242,765
[45] Date of Patent: Sep. 7, 1993

[54] GAS DIFFUSION ELECTRODES

[75] Inventors: Neal Naimer, Jerusalem; Eric E. Khasin, Rishon LeZion; Jonathan R. Goldstein; Jonathan Sassen, both of Jerusalem, all of Israel

[73] Assignee: Luz Electric Fuel Israel Limited, Jerusalem, Israel

[21] Appl. No.: 903,115

[22] Filed: Jun. 23, 1992

[51] Int. Cl.$^5$ .............................................. H01M 4/96
[52] U.S. Cl. ...................................... 429/42; 429/209
[58] Field of Search ................... 429/40, 42, 27, 209, 429/212, 217; 427/115; 29/623.5; 204/280, 294

[56] References Cited

U.S. PATENT DOCUMENTS

| | | |
|---|---|---|
| 2,664,376 | 12/1953 | Philipps .......................... 429/212 X |
| 3,549,422 | 12/1977 | Wagner . |
| 3,676,222 | 7/1972 | Deibert ................................. 429/42 |
| 4,017,663 | 4/1977 | Breault ............................. 429/42 X |
| 4,246,324 | 1/1981 | de Nora et al. . |
| 4,341,847 | 7/1982 | Sammells . |
| 4,382,113 | 5/1983 | Schwartz et al. .................... 429/209 |
| 4,405,544 | 9/1983 | Solomon . |
| 4,459,342 | 7/1984 | Shigeta et al. .................. 429/209 X |
| 4,463,064 | 7/1984 | Ruch et al. . |
| 4,505,994 | 3/1985 | Shimada et al. ................ 429/209 X |
| 4,565,749 | 1/1986 | van Ommering et al. . |
| 4,585,710 | 4/1986 | McEvoy . |
| 4,615,954 | 10/1986 | Solomon et al. . |
| 4,877,694 | 10/1989 | Solomon et al. . |
| 4,906,535 | 3/1990 | Hoge . |
| 4,908,281 | 3/1990 | O'Callaghan . |
| 4,925,744 | 5/1990 | Niksa et al. . |
| 4,957,826 | 9/1990 | Cheiky . |

*Primary Examiner*—Anthony Skapars
*Attorney, Agent, or Firm*—Jacobson, Price, Holman & Stern

[57] ABSTRACT

The invention provides a gas diffusion electrode containing a fiber reinforced composite structure in a layer thereof, the structure comprising structurally intact fibers precoated with sinterable polymeric material, which material is heat sintered, whereby the fibers are bonded to each other and to other components of the structure by the sintered polymeric material, while maintaining their individual fibrous structure and strength.

10 Claims, No Drawings

GAS DIFFUSION ELECTRODES

The present invention relates to gas diffusion electrodes and to methods for the preparation thereof. More particularly the present invention relates to gas diffusion electrodes for use in metal-air batteries and hydrogen-oxygen fuel cells.

Metal-air batteries of monopolar and bipolar design, both rechargeable and primary, as well as electrodes therefor, are known in the art as described, e.g., in U.S. Pat. Nos. 3,549,422; 4,246,324; 4,341,847; 4,463,064; 4,565,749; 4,585,710; 4,877,694; 4,908,281; 4,925,744 and 4,957,826.

As is known and described, e.g., in U.S. Pat. No. 4,908,281, metal-air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of carbon (with or without an added oxygen-reduction catalyst) in association with a finely divided polymeric material and incorporating a metal screen as the conductive element. A variety of anode metals have been used or proposed; among them, zinc, iron, lithium, aluminum, or alloys thereof are considered especially advantageous for particular applications, owing to their low cost, light weight, and ability to function as anodes in metal-air batteries using a variety of electrolytes. A typical aluminum-air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface.

Aqueous electrolytes for aluminum-air batteries consist of two major types, namely a neutral-pH electrolyte usually containing halide salts and, because of its relatively low electrical conductivity and the virtual insolubility of aluminum therein, is used for relatively low power applications. The high alkaline electrolyte types usually employ NaOH or KOH solution, and yield a higher cell voltage than the neutral electrolyte versions.

As described also in U.S. Pat. No. 4,906,535 in present-day commercial metal-air cell practice, the air cathode is commonly constituted of carbon (with or without an added dissociation-promoting catalyst) containing a finely divided hydrophobic polymeric material and incorporating a metal screen as the conductive element. A variety of anode metals are used including iron, zinc, magnesium, aluminum, alloys of aluminum, etc. Alloys of aluminum and magnesium are considered especially advantageous for particular applications owing to low cost, light weight and ability to function as anodes in metal-air batteries using neutral electrolytes, such as sea water or other aqueous saline solutions. Metal-air batteries have an essentially infinite shelf-storage life rendering them very suitable for standby or emergency uses in that the metal-air battery may be activated by immersing the electrode stack in an electrolyte. As stated the gas diffusion electrodes are usually comprised of a blocking layer, an active layer and a current collector.

The function of the blocking layer is to face the gas phase and allow penetration of the reactant gas (e.g. $O_2$) and accompanying gas (e.g. $N_2$) while preventing the permeation of electrolyte. The blocking layer usually comprises hydrophobic elements such as polyteterafluoroethylene (PTFE) in various forms such as films, particles and removable pore former, e.g. ammonium benzoate particles, and carbon black etc.

The active layer must be partially permeable to both the reactant gas (e.g. $O_2$) and liquid (e.g. KOH electrolyte). It further comprises a conducting element such as carbon optionally catalyzed with an electrocatalyst for the gas reaction (e.g. Pt, Ag, the cobalt complex of tetramethoxyphenyl porphyrin (CoTMPP) for $_2$ reduction) or unsupported electrocatalyst (e.g. Ag)).

The conducting and/or electroactive component is supported in a matrix with suitable binders, which confer a partially hydrophilic and partially hydrophobic character. The binders may be hydrophilic (e.g. fluorinated polymers such as the perfluorosulfonate ionomer produced by E. I. du Pont de Nemours under trademark of Nafion) or hydrophobic (e.g. polytetrafluoroethylene PTFE particles, PTFE/carbon mix). There may be an optional removable pore former in the matrix.

The current collector is a metallic support for the active and blocking layer and is placed between them or on either side thereof and allows current removal from the electrode. It usually comprises a woven or expanded mesh or coated mesh which is stable in the electrochemical environment of the electrode (e.g. nickel or silver plated nickel for KOH electrolyte, 25 mesh size, 0.005 inch strands). Alternatively the current collector may be a metallic felt mat (e.g. of nickel) as described in U.S. Pat. No. 07/633,518.

In preparing porous composite electrodes there is a constant search for improved electrodes and methods for the preparation thereof in order to provide an electrode which is more robust for practical application while maintaining high stable performance.

Thus as stated, e.g. in U.S. Pat. No. 4,877,694 porous electrodes containing catalytic particulates have been developed to advance the commercialization of electrolytic devices such as fuel cells and metal-air batteries. The electrodes can be useful as oxygen cathodes in such batteries and fuel cells. To enhance their commercial potential, efforts have been extended to augment the electrode capability to operate at high current densities while maintaining acceptable durability.

Attention has also been paid to the development of efficient and economical electrodes capable of performing in the harsh chemical environments created by acid or alkaline electrolytes. It has been necessary to attempt to maintain a balance for the permeability of the liquid electrolyte and for the gaseous reactant. Progress in electrode development has led to, for example, electrodes capable of sustained performance at current densities substantially above about 400 milliamps per square centimeter, while exhibiting acceptable resistance to electrolyte. However, long operating life with sustained, desirable performance including resistance to electrode flooding while retarding undesirable depletion of catalytic activity is still needed.

In U.S. Pat. No. 4,405,544 there is described and claimed a method for preparing an electrode active layer comprising mixing an aqueous dispersion of particulate polytetrafluoroethylene with an aqueous suspension of particulate carbon black; washing and drying; mixing with a pore-forming agent; fibrillating said mixture; drying; adding polytetrafluoroethylene fibers while chopping said dried fibrillated mixture and thereafter forming said chopped mixtures into a sheet, which is washed and dried.

In U.S. Pat. No. 4,877,694 there is described and claimed an electrode capable of extended performance at high current density, said electrode comprising a gas porous, gas supplying layer containing hydrophobic polymer, and an electrolyte porous active layer comprising catalyst containing carbon particles intimately blended with, and uniformly distributed throughout, hydrophilic halogenated polymer binder for said catalyzed carbon particles, which intimate blend is combined in said active layer with particulate substance bound with hydrophobic polymer.

Similarly in U.S. Pat. No. 4,906,535 there is described and claimed an electrochemical cathode, which comprises: a current collecting substrate capable of being connected to electrical circuitry; and conductive nonwoven webs laminated to said current collecting substrate and impregnated with a mixture of carbon particles and a nonfibrous polymer substance for holding said carbon particles in said web, said conductive nonwoven web being formed of conductive carbon fibers.

Furthermore there is described and claimed in U.S. Pat. No. 4,615,954 a fast response, high current density oxygen cathode comprising: a form-stable, electrically conductive, wetproofing layer composed essentially of an intimate, consolidated and heat sintered mixture of carbon black and particulate hydrophobic polymeric binder derived predominantly from polytetrafluoroethylene, having at least one anisometric electroconductive reinforcing material incorporated therein; and, directly adhered to one surface of said wetproofing layer, a porous active layer having a thickness between about 0.03 and about 0.1 millimeter and composed essentially of a mixture of particles of a polymer of tetrafluoroethylene and cobalt catalyst-containing particles of an active carbon predominantly of a size between about 2 and about 20 micrometers and having a B.E.T. surface area of over about 1000 $m^2$/gram.

In contradistinction to the electrodes described in the prior art and available on the market today and the methods for the preparation of the active and blocking layers thereof described in the literature, there is now provided, according to the present invention, a gas diffusion electrode containing a fiber reinforced composite structure in a layer thereof, said structure comprising structurally intact fibers precoated with sinterable polymeric material, which material is heat sintered, whereby said fibers are bonded to each other and to other components of said structure by said sintered polymeric material, while maintaining their individual fibrous structure and strength.

Thus it will be realised that the present invention provides for the first time structurally intact fibers, coated with sintered hydrophobic polymeric material as the reinforcing component for both active and blocking layers of gas diffusion electrodes.

In contradistinction, the above mentioned U.S. Pat. No. 4,906,535 describes a non-woven conductive fibrous web structure (a carbon felt) on which carbon particles are supported with the aid of a non fibrous polymeric substance. This Patent specifically notes on Column 4 line 37 that the thermal processing steps are well below the sintering temperature of the polymeric substance, whereas the electrodes of the present invention preferably comprise a particulate microstructure which is reinforced by coated fibers and in which the bonding of the complete structure is due to the sintering of both polymeric particles in the microstructure and in the coating of the fiber.

The optimization of the microstructure of the active layer in the electrodes of the present invention contribute to the achievement of high performance of the gas diffusion electrode. The microstructure obtained in U.S. Pat. No. 4,906,535 is basically dominated by the carbon felt skeleton to which other components are added on, and this is very limiting as to optimization. Moreover, the strength of the microstructure is poor in U.S. Pat. No. 4,906,535 because the polymeric binder is not sintered.

In U.S. Pat. No. 4,405,544 mentioned hereinbefore the powdered components are roll-pressed into a sheet at a rolling temperature of about 37° to 49° C. and the highest temperature used in the preparation thereof was 204° C. for the entirely different purpose of decomposing chloroplatinic acid to platinum. The temperature is insufficient to effect sintering of any of the polymeric components. In U.S. Pat. No. 4,877,694 mentioned hereinbefore sintering is indeed carried out at a temperature of between 250° C. and 350° C. however the mixture described therein does not contain reinforcing fibers and as shown in Table 1 and 2 in the comparative example hereinafter the tensile strength of a non-fiber reinforced layer is substantially lower than that of one prepared according to the present invention.

Furthermore, U.S. Pat. No. 4,615,954 teaches the sintering of a mixture containing both fibers and PTFE particles however as also shown in Table 1 and 2 in the comparative example hereinafter the tensile strength of a composition prepared from a mere mixture of fibers and PTFE particles also does not have this tensile strength achieved by providing structurally intact fibers precoated with sinterable polymeric material, which material is then heat sintered so that the precoated fibers are bonded to each other and to other components of the formed layer.

According to the present invention the skeleton of the electrode is formed by the arrangement of the particulate microstructure which can be independently optimized. To this, a reinforcing fibrous element is added and its coating sintered, which on the one hand does not detract from the microstructure and performance, yet on the other hand substantially improves strength.

In preferred embodiments of the present invention said fibers have a length of between about 100 and 5000 microns and a diameter of between about 5 and 500 microns. The fibers will preferably constitute 0.5–50 wt % of the layer and the thickness of the coating of said fibers will preferably be between 0.2 micron and 50 microns, wherein said coating thickness will usually not exceed one tenth of the thickness of the fiber.

The term "gas diffusion electrode" as are used herein relates not only to the air or oxygen cathodes as find application in metal-air batteries, such as aluminum-air and zinc-air batteries, but also relates to such electrodes as may find use in applications such as for electrochemical synthesis cells such as the chlor-alkali cell described in U.S. Pat. No. 4,405,544, related fuel cell applications, metal-gas cells (e.g. nickel-hydrogen) and nickel-hydride cells. It is therefore meant to be understood that the electrode of the present invention need not be limited to use as an air cathode, i.e., limited to use for oxygen reduction, but can be employed in a variety of reactions including hydrogen oxidation, sulphur dioxide oxidation, organic fuel oxidation, hydrogen evolution and oxygen evolution.

Moreover, a variety of electrolytes may come into contact with the gas diffusion electrode of the present invention, as represented by acid electrolytes, alkaline electrolytes and saline electrolytes. The electrolytes may be non-aqueous systems, and therefore the electrode may find use in applications such as organic electrolyte batteries. Where the electrode of the present invention may be made up from two layers, there will be used terms herein to describe the one, or hydrophobic layer, such as the "wetproof layer" or "backing layer" or "gas supplying layer." This layer can be made of "hdyrophobic ingredient" or "gas supplying material". Then the other, or partially hydrophilic layer, may often be referred to herein as the "active layer" and the material used in preparing it as the "active material" or "hydrophilic ingredient". Such active material can consist of a mixture of finely-divided catalyzed carbon plus hydrophilic binder, and/or hydrophobic binder.

During the processing of the electrode, thermal steps exceed the sintering temperature of the coating of the fiber but not that of the core material of the fiber. The fibers thus become bonded to the other components and to each other while maintaining fibrous structure and maintaining their original strength.

In a first preferred embodiment of the present invention said intact fibers could be carbon fibers coated with a fluoropolymer, while in another preferred embodiment of the present invention said intact fibers could be fluoropolymer fibers coated with a different fluoropolymer having a lower sintering temperature (e.g. PTFE having a sintering temperature of 355° C. coated with FEP fluoroethylene copolymer having a sintering temperature of 270° C.).

It has now been surprisingly found that electrodes produced according to the present invention are superior to electrodes having no fibers because of the inherent added mechanical strength provided by the fiber reinforced composite structures. They are also superior to electrodes with monocomponent fibers where the processing is either below or above the fiber sintering temperature. In the case where the processing temperature is below the sintering temperature of the fiber (e.g. carbon fibers, where processing is at 355° C.) the fibers do not themselves sinter and their adhesion to the structure is poor. In the case where the processing temperature is above the sintering temperature of the fiber (e.g. PTFE fibers where processing is at 355° C.), the fibers undergo massive melting and lose their structural integrity, and this has a detrimental effect on the electrode microstructure.

As will be demonstrated hereinafter the present invention provides stable high power electrode performance with improved mechanical strength compared with prior art electrodes. As will be realised, improved mechanical strength is a vital requirement for metal-air batteries (e.g. for EV applications with mechanically rechargeable anodes, in which mechanical wear and tear requirements are especially severe), or generally in metal-air, electro synthesis cells or fuel cell systems due to the fact that the gas electrode forms an external exposed wall of the cell and must not leak electrolyte.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

A coated fiber-reinforced blocking layer precursor for a gas diffusion electrode which can be used in a metal-air battery, in a hydrogen-oxygen fuel cell, in an electrosynthesis cell or for similar uses was made as follows:

62 gm of acetylene carbon black (Shawinigan Black, Chevron) was dispersed in distilled water (3.2 l) by means of an overhead stirrer. To this, 38 gm of particulate ethylene propylene co-polymer dispersion (FEP-T120 dispersion, DuPont) was added, and the mixture further blended by the stirrer. The resulting dispersion was filtered on a Buchner funnel and the moist solid was then dried overnight in an oven at 150° C. The dried solid was then heat treated at 250° C. for 24 hours in order to remove the wetting agent of the FEP dispersion. The resulting FEP/carbon mixture was then chopped using a coffee grinder (SEB, type 8115) for two minutes.

A 0.8 gm portion of the above FEP/carbon mixture was then mechanically blended with 0.2 gm of FEP coated PTFE fibers (W. L. Gore and Assocs. Inc) in a Pascall Lab Mixer, followed by chopping in the coffee grinder. The chopped mixture was added to isopropanol (30 ml) and homogenized in a blender (Moulinex, type 276). The homogenized mixture was then filtered to form a 40 cm$^2$ mud-like layer, and dried at about 120° C. while being compressed at 50 kg/cm$^2$. This dried layer could then be used as the blocking layer precursor for a gas diffusion electrode (see Example 2).

EXAMPLE 2

A coated fiber-reinforced active layer for a gas diffusion electrode and the air electrode itself were made as follows:

800 ml of isopropanol was stirred together with 300 ml of hydrophilic fluorinated polymer solution (Nafion 1100 EW, Solution Technology Inc.). A 50 gm portion of Shawinigan black catalyzed by 10 wt % CoTMPP electrocatalyst (Aldrich) was thoroughly dispersed in the above solution using an overhead mixer. This mixture was then dried at 55° C. overnight. The dried catalyzed mixture was then chopped as described in Example 1.

An 0.45 gm portion of the chopped catalyzed product was then mechanically blended with 0.08 gm FEP powder (DuPont, Teflon P 532-8000) and 0.05 gm of FEP-coated PTFE fibers (Gore) in the Pascall Lab Mixer followed by chopping in the coffee grinder. The resulting chopped mixture was added to isopropanol (30 ml) and homogenized in the Moulinex blender. The homogenized mixture was then filtered through the blocking layer from Example 1 to form a 40 cm² mud-like layer onto which a nickel mesh current collector (40 mesh size) was placed. The resulting matrix was dried at about 120° C. while being compressed at 200 kg/cm². The dried matrix was then sintered at 305° C. for 30 minutes under a pressure of 10 kg/cm². This dried matrix could then be used as an oxygen reduction cathode.

A 6 cm² section of the air electrode was tested for electrochemical performance in a test cell using $CO_2$ scrubbed air and a 7.5 M/l KOH electrolyte at 25° C. The air electrode faced an inert nickel counter electrode in the cell. The electrolyte filled the gap between the air electrode and the counter electrode while air was supplied to the back of the air electrode via the blocking layer. Polarization of the air electrode as induced by a DC power supply was measured against a standard Hg/HgO reference electrode immersed in the electrolyte.

After an overnight soaking in the cell, the air electrode was polarized in the following continuous cyclic mode:

```
30 secs at 200 mA/cm²
45 secs at 50 mA/cm²
45 secs at 0 mA/cm²
```

After one hour the electrode provided 400 mA/cm² at −290 mV vs. the reference and 200 mA/cm² at −180 mV vs. the reference. This is excellent performance for an oxygen reduction electrode. No change in performance was detectable over 200 hours of performance.

EXAMPLE 3

Samples of both blocking layer and active layers with optimized microstructures were prepared for tensile strength testing.

Three blocking layer samples were prepared as in Example 1, and then subsequently pressed at 200 kg/cm². The test specimens prepared from the three samples had the approximate dimensions 50×10×1 mm³. The compositions, sintering temperatures and measured tensile strengths are shown in Table 1.

TABLE 1

| SAMPLE NO. | COMPOSITION WT % | | | | SINTERING TEMP °C. | TENSILE STRENGTH KG/CM² |
|---|---|---|---|---|---|---|
| | Carbon Black | FEP T120 | Uncoated PTFE Fibers | FEP Coated PTFE Fibers | | |
| 1A | 62 | 38 | 0 | 0 | 305 | 4.6 |
| 1B | 49.6 | 30.4 | 20 | 0 | 305 | 5.0 |
| 1C | 49.6 | 30.4 | 0 | 20 | 305 | 13.1 |

As may be seen, the tensile strength of the coated fiber-reinforced sample (1C) much exceeded that of the non-reinforced sample (1A) and that of the monocomponent PTFE fiber reinforced sample (1B) sintered at the same temperature.

Three active layer samples for tensile strength testing were prepared as in Example 2, with the exception that the filtering step was performed without the supporting blocking layer, and further that the nickel current collector mesh was not introduced prior to drying the filtered layer. The test specimens prepared from the three samples had the approximate dimensions 50×10×1 mm³. The compositions, sintering temperatures and measured tensile strengths are collected in Table 2.

TABLE 2

| SAMPLE NO. | COMPOSITION WT % | | | | SINTERING TEMP. °C. | TENSILE STRENGTH KG/CM² |
|---|---|---|---|---|---|---|
| | Catalyzed Carbon & Hydrophilic Polymer | FEP Powder | PTFE Fibers | FEP Coated PTFE Fibers | | |
| 2A | 84.9 | 15.1 | 0 | 0 | 305 | 1.0 |
| 2B | 77.6 | 13.8 | 8.6 | 0 | 305 | 1.8 |
| 2C | 77.6 | 13.8 | 0 | 8.6 | 305 | 6.6 |

As can be seen from Table 2, the tensile strength of the coated-fiber reinforced sample (2C) much exceeded that of the non-reinforced sample (2A), and that of the monocomponent PTFE fiber reinforced sample sintered below the PTFE sintering temperature (2B).

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A gas diffusion electrode containing a fiber reinforced composite structure in a layer thereof, said structure comprising structurally intact fibers precoated with sinterable polymeric material, which material is heat sintered, whereby said fibers are bonded to each other and to other components of said structure by said sintered polymeric material, while maintaining their individual fibrous structure and strength.

2. A gas diffusion electrode according to claim 1, wherein said layer is an active layer.

3. A gas diffusion electrode according to claim 1, wherein said layer is a blocking layer.

4. A gas diffusion electrode according to claim 3, wherein said polymeric material is hydrophobic.

5. A gas diffusion electrode according to claim 1, wherein said electrode is part of a metal-air battery.

6. A gas diffusion electrode according to claim 1, wherein said electrode is part of a hydrogen-oxygen fuel cell.

7. A gas diffusion electrode according to claim 1, wherein said electrode is part of an electrosynthesis cell.

8. A gas diffusion electrode according to claim 1, wherein said fibers have a length of between about 100 and 5000 microns and a diameter of between about 5 and 500 microns.

9. A gas diffusion electrode according to claim 1, wherein said intact fibers are carbon fibers, coated with a fluoropolymer.

10. A gas diffusion electrode according a claim 1, wherein said intact fibers are fluoropolymer fibers, coated with a different fluoropolymeric material, said material having a lower sintering temperature than said fibers.

* * * * *